United States Patent

[11] 3,607,937

[72] Inventors Eiji Otsuka;
 Kazumichi Kanai; Tadao Sakai, all of Fujisawa, Japan
[21] Appl. No. 740,114
[22] Filed June 26, 1968
[45] Patented Sept. 21, 1971
[73] Assignee Mitsui Toatsu Chemicals Incorporated
 Tokyo, Japan

[54] TWO-STAGE UREA SYNTHESIS
 8 Claims, 1 Drawing Fig.
[52] U.S. Cl. .......................................................... 260/555 A
[51] Int. Cl. ...................................................... C07c 127/00
[50] Field of Search ............................................ 260/555

[56] References Cited
 UNITED STATES PATENTS
 3,470,247 9/1969 Guadalupi ..................... 260/555
 3,248,425 4/1966 Ledergerber .................. 260/555

FOREIGN PATENTS
1,124,547 8/1968 Great Britain ................. 260/555

OTHER REFERENCES
Cline, Manufacture of Urea: A Literature Survey, Tennessee Valley Authority, Report No. 646, March 6, 1951, Wilson Dam, Alabama (page 34).

*Primary Examiner*—Daniel D. Horwitz
*Assistant Examiner*—Michael W. Glynn
*Attorney*—Christen, Sabol & O'Brien

ABSTRACT: Two-stage synthesis of urea comprising synthesizing urea in a first urea synthesis zone without recycle of the unreacted starting materials, separating the unreacted starting material from the resulting synthesis effluent, absorbing the unreacted starting material separated into an absorbent, subjecting to the resulting absorbate to the distillation at a pressure in a second urea synthesis zone and utilizing the unreacted starting material separated by the distillation in the second urea synthesis zone.

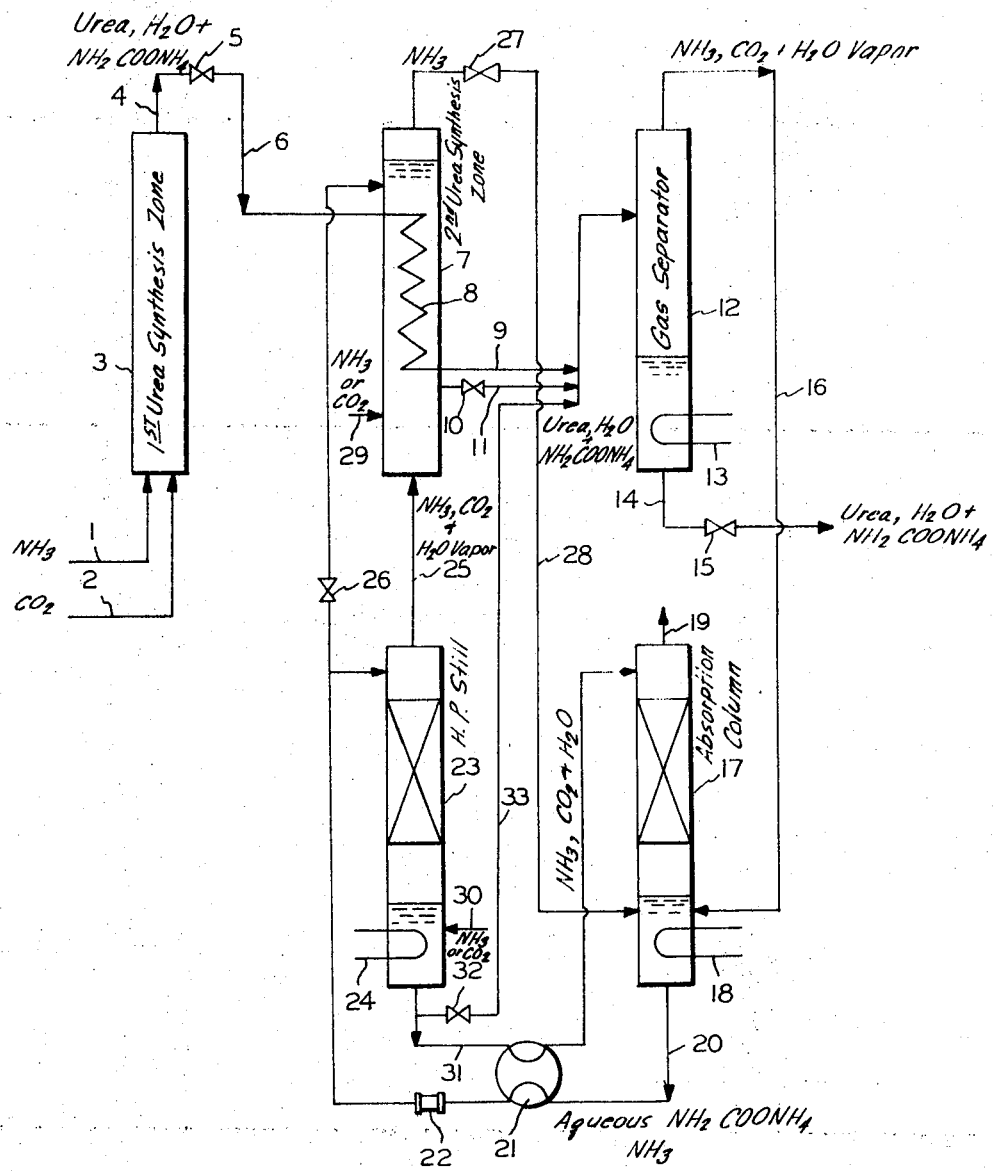

TWO-STAGE UREA SYNTHESIS

This invention relates to an improvement in a method of synthesizing urea in two stages from ammonia and carbon dioxide.

We have provided a method of improving the overall conversion ration by carrying out the synthesis of urea in two stages. In this method, the synthesis of urea in the first stage is carried out by using a rather high temperature and pressure and without recirculating the recycle solution containing unreacted ammonium carbamate. Therefore, an absorbent for unreacted ammonium carbamate such as water is not introduced into the synthesis of urea, thus the conversion ratio in the first stage has reached 80 to 85 percent and has remarkably improved as compared with the conversion ratio of 50 to 70 percent in the conventional method wherein the recycle solution containing unreacted ammonium carbamate is recirculated. The urea synthesis in the second stage is carried out by using as a raw material the unreacted ammonium carbamate separated from the urea synthesis effluent obtained in the first stage. The unreacted ammonium carbamate is separated by bringing the excess ammonia separated from the urea synthesis effluent and the urea synthesis effluent from which the excess ammonia has been separated into contact with each other at the urea synthesis pressure in the second stage. The separated unreacted ammonium carbamate is subjected to the urea synthesis in the second stage. The unreacted ammonium carbamate in the urea synthesis effluent from the urea synthesis in the second stage is recovered as an aqueous solution by a conventional method and is recirculated to the urea synthesis in the second stage. In this method, the overall conversion ratio reaches 85 to 90 percent. However, as the unreacted ammonium carbamate is separated by using ammonia under the urea synthesis pressure in the second stage, there are various difficulties in working this method, though it is theoretically possible to separate substantially all of the unreacting substance. First of all, in the case of separating the unreacted ammonium carbamate, the hydrolysis of urea occurs, because, as this separation is carried out above 100 atm., the temperature exceeds 200° C. Second, from the viewpoint of the separation of the unreacted ammonium carbamate, it is necessary to make the pressure in this separation step as low as possible. On the other hand, as the urea synthesis pressure in the second stage is the same as the pressure in this separation step, it is not desirable to make the pressure as low as possible from the viewpoint of the urea synthesis. Such requirement contradicting each other is encountered. Third, in the case of separating the unreacted ammonium carbamate by using ammonia, the unreacted ammonium carbamate is substantially separated but, instead, ammonia is present as dissolved in the resulting solution. The ammonia must be after all separated by heating.

An object of the present invention is to provide an improved method of synthesizing urea in two stages from ammonia and carbon dioxide.

Another object of the present invention is to provide two-stage urea synthesis process wherein the unreacted ammonium carbamate in the first urea synthesis effluent can be easily separated without hydrolysis of urea.

Further object of the present invention is to provide two-stage urea synthesis process wherein the urea synthesis pressure in the second stage can be made high.

An improved process for synthesizing urea in two stages from ammonia and carbon dioxide comprises reacting ammonia with carbon dioxide at a first urea forming temperature and pressure in the first urea synthesis zone, expanding the resulting first urea synthesis effluent, introducing the expanded urea synthesis effluent into a distillation zone to separate the unreacted ammonium carbamate as a gaseous mixture of ammonia and carbon dioxide, absorbing the gaseous mixture into aqueous absorbent in an absorption zone, subjecting the resulting absorbate to the distillation at a pressure in the second urea synthesis zone to separate the ammonia and carbon dioxide contained therein as a gaseous mixture, maintaining the thus obtained gaseous mixture at a urea forming temperature in the second urea synthesis zone to form a second urea synthesis effluent and recovering urea from said first and second urea synthesis effluents having the unreacted ammonium carbamate separated. The gaseous mixture of ammonia and carbon dioxide separated from the second urea synthesis effluent may be absorbed into the aqueous absorbent together with the gaseous mixture separated from the first urea synthesis effluent in the absorption zone. The absorbate having the ammonia and carbon dioxide separated by the distillation is recirculated to the absorption zone to be utilized for the aqueous absorbent.

In the present invention, the absorbate obtained by absorbing into an absorbent the gaseous mixture of ammonia and carbon dioxide separated from the first urea synthesis effluent is subjected to distillation under a pressure substantially equal to the urea synthesis pressure in the second stage. However, it is not necessary to separate by this distillation all of the ammonia and carbon dioxide in the absorbate. Therefore the distillation can be carried out under a high pressure at which the urea synthesis in the second stage can be carried out advantageously. The preferable distillation pressure is 130 to 200 kg./cm.$^2$. by gauge, specifically 150 to 200 kg./cm.$^2$ by gauge and the preferable distillation temperature is 180° to 250° C., specifically 210° to 230° C.

The ammonia and carbon dioxide thus separated from the absorbate are introduced into the urea synthesis in the second stage. The preferable temperature in this urea synthesis stage is 160° to 200° C., specifically 180° to 190° C. In order to keep this synthesis temperature, the heat of formation of ammonium carbamate is removed by being utilized as a heat source for the generation of steam or the decomposition of the unreacted ammonium carbamate in the urea synthesis effluent from the first stage. Further, in order to adjust the mol ratio of ammonia to carbon dioxide in the urea synthesis in the second stage, a part of the ammonia or carbon dioxide to be introduced into the urea synthesis in the first stage is introduced into the step of distilling the absorbate. In this case, the distillation of ammonia and carbon dioxide from this absorbate is accelerated by the introduction of ammonia or carbon dioxide. Needless to say, a part of the ammonia or carbon dioxide to be introduced into the first urea synthesis autoclave can be introduced into the second urea synthesis autoclave.

The present invention shall now be explained with reference to the accompanying drawing. A stream 1 of liquid ammonia and a stream 2 of carbon dioxide are introduced into the first urea synthesis autoclave 3 and are reacted with each other at 190° to 210° C. and 200 to 350 kg./cm.$^2$ by gauge. It is preferable that the mol ratio $NH_{3/CO_2}$ of the ammonia to the carbon dioxide in the first urea synthesis autoclave is made 3 to 6: 1. A stream 4 of the first urea synthesis effluent coming out of the first urea synthesis autoclave is passed through a reduction valve 5 to be expanded preferably to 10 to 50 kg./cm.$^2$. by gauge, most preferably to 10 to 30 kg./cm.$^2$ by gauge. A stream 6 of the expanded urea synthesis effluent is introduced into a heat-exchanger 8 provided in the second urea synthesis autoclave 7 and is heated by exchanging heat with the urea synthesis effluent in the second urea synthesis autoclave to decompose the unreacted ammonium carbamate into ammonia and carbon dioxide. A stream 9 coming out of the heat-exchanger 8 is introduced into a gas separator 12 together with a stream 11 of the second urea synthesis effluent expanded to the same pressure as that of the stream 6 by being passed through a reduction valve 10. The bottom part of the gas separator 12 is heated with a heating pipe 13. The temperature of the urea synthesis effluent is kept preferably at 120° to 160° C. The major part of excess ammonia and unreacted ammonium carbamate is separated as a gaseous mixture of ammonia, carbon dioxide and water vapor. A stream 14 of the urea synthesis effluent from the bottom part of the gas separator 12 is further expanded to 1 to 5 kg./cm.$^2$ by gauge through a reduction valve 15 and all of the remaining lower part of the second urea synthesis autoclave. This gaseous mixture was condensed in the second urea synthesis autoclave which was kept at 185° C. and 180 kg./cm.² by gauge and was taken out as the above-described urea synthesis effluent. The heat generated in this case was utilized to heat the urea synthesis effluent from the first urea synthesis autoclave by heat-exchange as described above.

The aqueous solution of urea in the above-described gas separator was expanded and then treated by a conventional method to obtain 100 parts of urea. The separated gas was condensed in the low-pressure absorption column to form a solution consisting of 13 parts/hr. of $NH_3$, 6 parts/hr. of $CO_2$ and 21 parts/hr. of $H_2O$ and was fed together with a solution consisting of 8 parts/hr. of $NH_3$, 3 parts/hr. of $CO_2$ and 12 parts/hr. of $H_2O$ from the high-pressure distillation column into the gas separator to be treated.

We claim:

1. In a process for synthesizing urea in two stages wherein a fresh feed of ammonia is reacted with a fresh feed of carbon dioxide at a first urea forming temperature and pressure in a first urea synthesis zone to form a first urea synthesis effluent said first urea synthesis effluent is expanded to a pressure lower than said first urea forming pressure, the unreacted ammonium carbamate contained in said expanded first urea synthesis effluent is separated as a gaseous mixture of ammonia and carbon dioxide, said gaseous mixture is maintained at a second urea forming temperature and pressure in a second urea synthesis zone to form a second urea synthesis effluent and urea is obtained from said first and second urea synthesis effluents having the unreacted ammonium carbamate separated, the improvement which comprises absorbing said gaseous mixture separated from said first urea synthesis effluent into an aqueous absorbent in an absorption zone to form an absorbate, subjecting a portion of said absorbate to a distillation at said second urea forming pressure in a distillation zone to separate ammonia and carbon dioxide contained therein as a gaseous mixture and forming a depleted absorbate, condensing said gaseous mixture separated from said absorbate in said second urea synthesis zone at a urea forming temperature of 160 to 200° C. to form said second urea synthesis effluent.

2. The improvement as claimed in claim 1 wherein the unreacted ammonium carbamate contained in said second urea synthesis effluent is separated as a gaseous mixture of ammonia and carbon dioxide and is absorbed into said aqueous absorbent together with said gaseous mixture from said first urea synthesis effluent.

3. The improvement as claimed in claim 1 wherein said depleted absorbate is recirculated to said absorption zone and utilized for said aqueous absorbent.

4. The improvement as claimed in claim 1 wherein said first urea synthesis effluent is in indirect heat exchange with said second urea synthesis zone.

5. The improvement as claimed in claim 1 wherein a portion of said absorbate is introduced into said second urea synthesis zone without being subjected to said distillation.

6. The improvement as claimed in claim 1 wherein an additional fresh feed selected from the group consisting of ammonia and carbon dioxide is introduced through the bottom part of said distillation of ammonia and carbon dioxide from said absorbate.

7. The improvement as claimed in claim 3 wherein said portion of said absorbate introduced into said distillation zone is heated by heat-exchange with said depleted absorbate.

8. The improvement as claimed in claim 1 wherein substantially all of said absorbate is subjected to distillation.